United States Patent [19]
Smith

[11] 3,868,003
[45] Feb. 25, 1975

[54] BRAKE ACTUATED RETURN TO NEUTRAL MECHANISM

[75] Inventor: Kenneth Smith, Batley, England

[73] Assignee: Joshua Shaw & Sons Limited, Batley, England

[22] Filed: May 9, 1973

[21] Appl. No.: 358,683

[30] Foreign Application Priority Data
Feb. 23, 1973 Great Britain.................... 8925/73

[52] U.S. Cl. ................................. 192/4 B, 74/481
[51] Int. Cl. ...................... G05g 11/00, B60k 29/02
[58] Field of Search ........................ 74/481; 192/4 B

[56] References Cited
UNITED STATES PATENTS

| | | | |
|---|---|---|---|
| 3,276,286 | 10/1966 | Wright et al.......................... | 74/481 |
| 3,316,773 | 5/1967 | Findlay................................. | 74/481 |
| 3,511,105 | 5/1970 | Matter.................................. | 74/481 |
| 3,618,718 | 11/1971 | Blaauw............................... | 192/4 B |
| 3,645,368 | 2/1972 | Blaauw............................... | 192/4 B |

Primary Examiner—Allan D. Herrmann
Attorney, Agent, or Firm—Wolf, Greenfield & Sacks

[57] ABSTRACT

In a wheeled vehicle incorporating hydrostatic transmission, wherein the hydrostatic transmission has a variable swash plate pump of which the pump swash plate is positionable between a forward driving inclination, a neutral position where the pump has no output, and a reverse drive inclination by means of a pump swash plate adjustment mechanism operable by means of a pivot lever, the vehicle is provided with a foot operated pedal which is coupled to the connection between the operator handle and the pivot lever so that operation of the foot pedal positions the pivot lever to the neutral position regardless of the position to which it has previously been positioned by operation of the handle. The vehicle may have wheel brakes operated hydraulically, a hydraulic actuator serving to position the pivot lever to the neutral position upon actuation of the brake pedal. The connection between the handle and the pivot lever includes two pivot assemblies arranged to be pivoted as a unit by operation of the handle and to be pivoted relative to one another by operation of the foot pedal.

2 Claims, 6 Drawing Figures

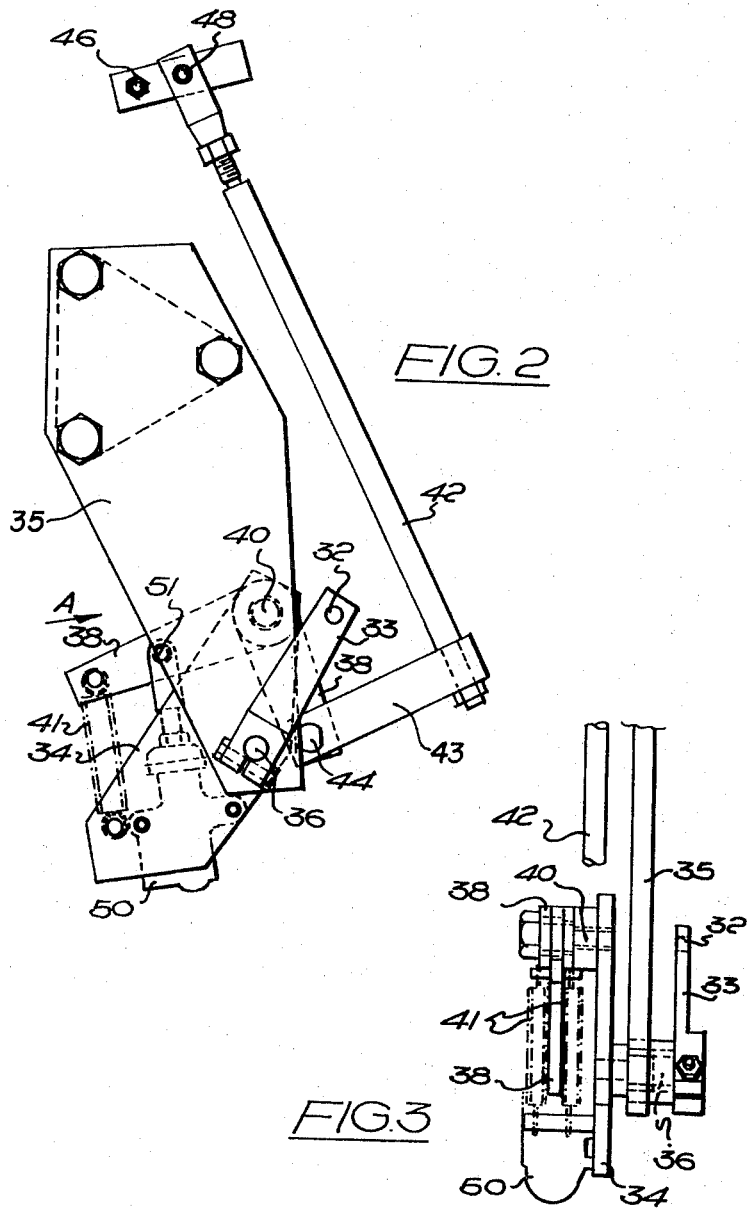

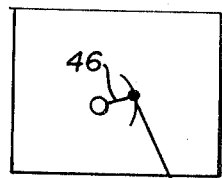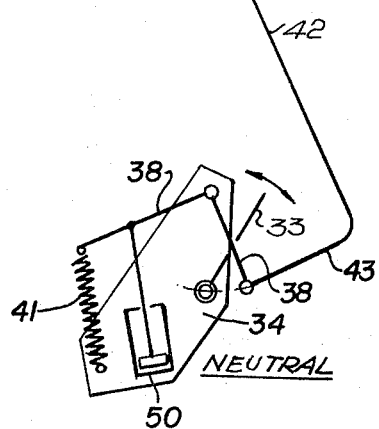
FIG.4
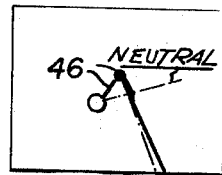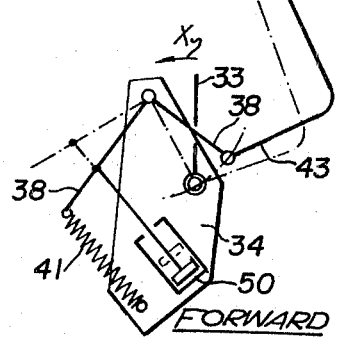
FIG.5
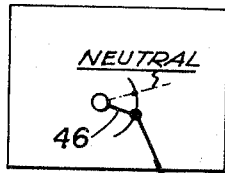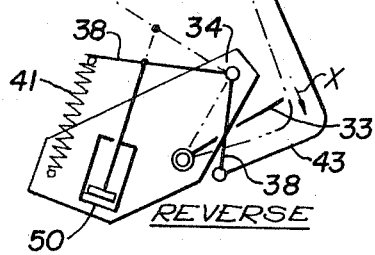
FIG.6

BRAKE ACTUATED RETURN TO NEUTRAL MECHANISM

This invention relates to wheeled vehicles incorporating hydrostatic transmission, wherein the hydrostatic transmission has a variable swash plate pump of which the pump swash plate is positionable between a forward driving inclination, neutral position where the pump has no output, and a reverse drive inclination by means of a pump swash plate adjustment mechanism operable by means of a swash plate pivot lever. Such vehicles will be referred to hereinafter as "vehicles of the type aforesaid."

Vehicles of the type aforesaid are comprised mainly by load handling or slow moving load trailing vehicles such as side loaders, fork lift trucks, tractors, dumper trucks and the like.

In vehicles of the type aforesaid there is normally an operator handle and a connecting means between the handle and the swash plate pivot lever so that by positioning the handle to a forwards, reverse of neutral position, the driver can cause the vehicle to move forwards or rearwards or cause it to stop, the hydrostatic transmission providing the braking effort when the handle is positioned to the neutral position.

In cases where it is desired that the vehicle should be braked, the operator may require to use his hands for operating other controls of the vehicle and this invention is concerned with providing means whereby this difficulty may be overcome.

Proposals have been made for vehicles of the type aforesaid to be provided with a foot operated pedal which is arranged not only to apply conventional brakes of the vehicle but also to return the operator handle to its neutral position for any driving position in which it has been set by the operator, thereby returning the swash plate to its neutral non-driving position. However, this arrangement has the disadvantage that after each operation of the brake pedal the operator handle has to be re-set to a driving position, which can be a nuisance and become tiring for the operator if working conditions call for frequent momentary applications of the brakes.

According to the present invention, the vehicle is provided with a foot operated pedal which is coupled to the connection between the operator handle and the swash plate pivot lever so that operation of the foot pedal positions the pivot lever to the neutral position regardless of the position to which it has previously been positioned by operation of the handle and without moving the handle from that previous position. Thus there is provided an overriding control for the transmission which enables the braking effect of the pump with its swash plate in neutral position to be utilized, but with an automatic return of the swash plate to its preset driving position upon release of the pedal.

The vehicle may be provided with wheel brakes which are operated as a result of operation of the brake pedal. To this end the wheel brakes may be hydraulically operated and a hydraulic actuator serves to position the swash plate pivot lever to the neutral position upon actuation of the brake pedal.

The connection between the handle and the swash plate pivot lever may include a first pivot assembly pivotable about a first stationary pivot axis, a second pivot assembly pivotable on the first pivot assembly about a second pivot axis spaced from and parallel to the first pivot axis, and a link pivotally connected to the second pivot assembly at a third pivot axis parallel to the first and second pivot axis and spaced from said second pivot axis and also pivotally connected to the swash plate pivot lever at a fourth pivot axis parallel to the first, second and third pivot axes and spaced from the first and third pivot axes, the spacing between the first and second pivot axes equalling the spacing between the second and third pivot axes, and the spacing between the fourth and first pivot axes equalling the spacing between the fourth pivot axis and the third pivot axis, the arrangement being such that operation of the handle causes pivoting of the first assembly and the second assembly as a unit about the first pivot axis, and the operation of the foot pedal effects pivotal movement of the second pivot assembly on the first about the second pivot axis whereby the third pivot axis is made coincident with the first pivot axis so that the swash plate pivot lever is brought to the neutral position.

There may be a spring acting between the first and second assemblies tending to keep these assemblies fixed in position one relative to the other. Pivoting of the second assembly on the first would therefore be against spring action.

An embodiment of the invention will now be described, by way of example, with reference to the accompanying drawings, wherein;

FIG. 2 shows, in enlarged detail, a section of the connection shown in FIG. 1;

FIG. 3 is a view seen in the direction of arrow A on FIG. 2 with portion omitted; and FIGS. 4, 5 and 6 are line diagrams illustrating the action of the parts shown in FIG. 2.

Figure 1:
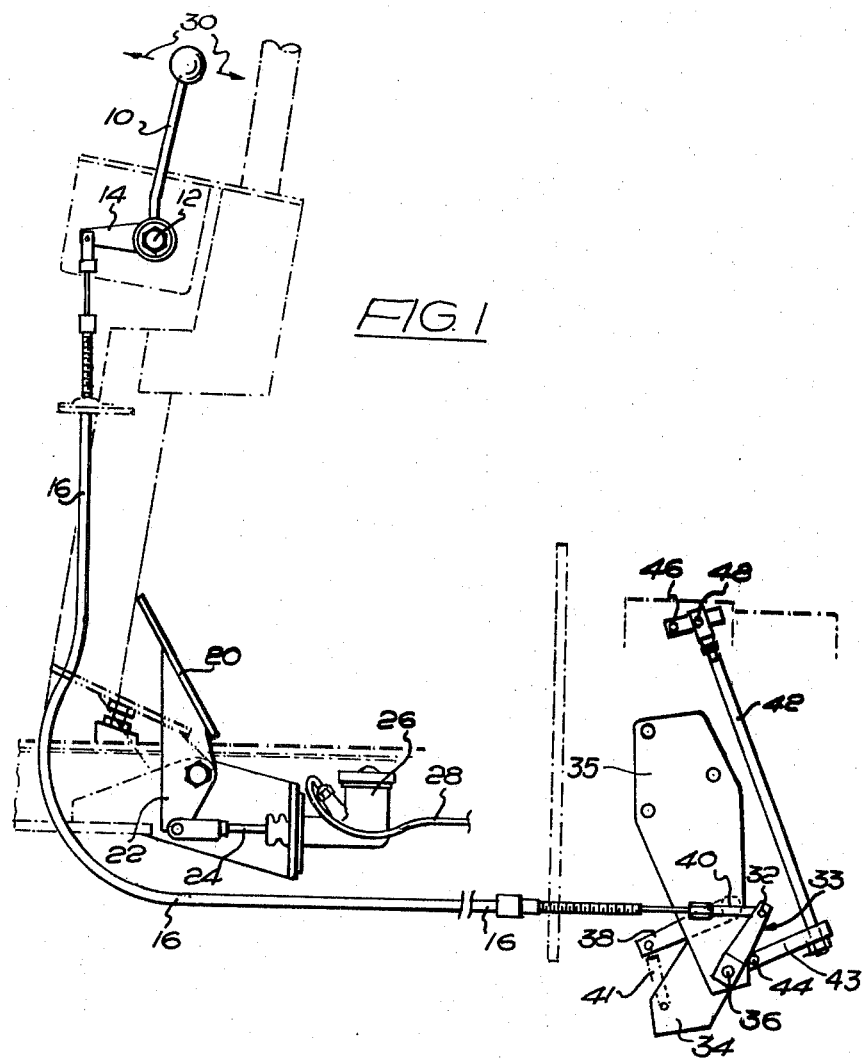
FIG. 1 is an elevation showing the connections between the pump swash plate control handle and the pump swash plate pivot lever.

In FIG. 1, the control handle shown at 10 is pivotable about axis 12. The handle 10 is rigidly connected to an arm 14 to the end of which is connected a flexible Boden Cable linkage 16. The other end of the Boden cable 16 is connected to a first pivot assembly to be described in relation to FIGS. 2 and 3. The vehicle brake pedal is shown at 20 and it will be seen that via pivoted arm 22 and tool 24, this pedal 20 is adapted to pressurize a master cylinder 26 from which leads a feed pipe 28. This pipe 28 leads to a hydraulic actuator 50 shown in FIGS. 2 and 3. The handle 10 and brake pedal 20 are shown in the neutral and off positions respectively. The pedal 20 and handle 10 are located conveniently in the operator's cabin or platform for operation and manipulation by the operators foot and hand respectively. The handle 10 is moved as indicated by arrows 30 to position the pump swash plate for forwards or reverse driving.

Referring now to FIGS. 2 and 3, the other end of the Boden cable 16 is connected at 32 to a first pivot assembly comprising an arm 33 and a plate 34, which assembly is pivotably mounted on a support bracket 35 by a stationary first pivot axis 36 so that manipulation of handle 10 effects pivoting of the first assembly about axis 36.

A second pivot assembly in the form of a bell crank lever 38 is pivotally mounted on plate 34 at a second pivot axis 40 which is parallel to the first axis 36. Tension springs 41 connect the first and second assemblies, tending to keep the assemblies fixed one relative to the other, and a connecting link 42 is pivotally connected through an arm 43 to the end of one arm of the lever 38 at a third pivot axis 44 which is parallel to the first and second pivot axes 36, 40 and the link 42 is pivotally connected to the swash plate pivot lever 46 at a fourth pivot axis 48. The distance between the first and second axes 36, 40 is equal to the distance between the second pivot axis 40 and the third pivot axis 44, and the distance between the fourth pivot axis 48 and the first pivot axis 36 is equal to the distance between the fourth pivot axis 48 and the third pivot axis 44. This arrangement provides that actuation of hydraulic actuator 50, which is mounted on plate 34 and is connected to bell crank 38 at 51 causes the third pivot axis 44 to swing into a position to coincide with the first pivot axis 36 so that the fourth pivot axis 48 automatically takes up a position in which the pivot lever 46 is positioned to the pump swash plate neutral position. This occurs regardless of the position of handle 10.

In operation, movement of the handle 10, through the cable 16 effects pivoting of the first assembly and second assembly pivot axis 36 at a unit, thereby altering the setting of lever 46 effecting forward or reverse drive of the vehicle. With the handle 10 in such a position, depression of the foot pedal 20 acts, by the extending movement of actuator 50, to bring the axis 44 to coincide with axis 36, moving the swash plate of the pump to its neutral position and therefore braking the vehicle.

These movements of the mechanism are indicated in FIGS. 4, 5 and 6 wherein the direction of rotation of arm 33 and thereby plate 34 is indicated by arrow X and the position to which link 42 is moved by the extension of actuator 50 to return the swash plate to its neutral position from either forward or reverse is indicated by dot-and-dash lines.

The invention thus provides an overriding control for the transmission whereby the vehicle can be braked through neutralizing of the swash plate position by depression of the foot pedal 20 without altering the setting of the operator handle. The stroke of the actuator 50 is suitably controlled to ensure the positioning of axis 44 coincident with axis 36 when the actuator is operated.

The vehicle may be provided with hydraulic wheel brakes which can be operated also by depression of foot pedal 20 which is arranged in any conventional manner (not illustrated) to apply the brakes at the same time as it causes operation of the actuator 50.

I claim:
1. In a wheeled vehicle of the type having
   a. a pedal for applying brakes to the vehicle;
   b. a hydrostatic transmission employing a variable swash plate pump whose swash plate is selectively positionable to a forward driving inclination, a neutral position where the pump has no output, and a reverse drive inclination;
   c. a pivot lever for moving the swash plate to the selected position;
   d. a manually operated handle for placing the swash plate in a selected position; and
   e. means for causing the swash plate to move to the neutral position when the pedal is activated to apply the brakes, the improvement wherein activation of the pedal causes the swash plate to be brought to its neutral position without altering the position of the manually operated handle, the improvement comprising:
   1. a first assembly mounted to pivot about a stationary first axis;
   2. a second assembly having a crank mounted to pivot on the first assembly about a second axis spaced from and parallel to the first axis, the second assembly having means responsive to activation of the brake pedal for causing the crank to pivot relative to the first assembly about the second axis;
   3. means connecting the manually operated handle to the first assembly whereby movement of the handle causes movement of the first and second assemblies as a unit about the first axis;
   4. a link pivotally connected to the crank at a third axis parallel to and spaced from the second axis, the link being pivotally connected to the pivot lever at a fourth axis parallel to and spaced from the third axis; and
   5. the third axis and the first axis being spaced equidistantly from the second axis whereby activation of the brake pedal causes the crank to pivot and bring the third axis into alignment with the first axis without altering the position of the manually operated handle.
2. The improvement according to claim 1, further including
   6. spring means carried on the first assembly and connected to the crank arm, and spring means acting to return the crank to its initial position upon deactivation of the brake pedal.

* * * * *